United States Patent
Gan

(10) Patent No.: US 8,647,801 B2
(45) Date of Patent: *Feb. 11, 2014

(54) NATURAL OIL-BASED CHEMICALLY PRODUCED TONER

(75) Inventor: Seng Neon Gan, Kuala Lumpur (MY)

(73) Assignees: Universiti Malaya, Kuala Lumpur (MY); Jadi Imaging Technologies SDN. BHD., Selangor (MY)

( * ) Notice: Subject to any disclaimer, the term of this patent is extended or adjusted under 35 U.S.C. 154(b) by 48 days.

This patent is subject to a terminal disclaimer.

(21) Appl. No.: 13/497,675

(22) PCT Filed: Jun. 1, 2010

(86) PCT No.: PCT/MY2010/000090
§ 371 (c)(1),
(2), (4) Date: Mar. 22, 2012

(87) PCT Pub. No.: WO2011/037446
PCT Pub. Date: Mar. 31, 2011

(65) Prior Publication Data
US 2012/0322003 A1    Dec. 20, 2012

(30) Foreign Application Priority Data
Sep. 24, 2009 (MY) ................................ PI20093973

(51) Int. Cl.
G03G 9/08 (2006.01)
(52) U.S. Cl.
USPC ............... 430/109.1; 430/109.3; 430/109.4; 430/137.15
(58) Field of Classification Search
USPC ............... 430/109.1, 109.3, 109.4, 137.15
See application file for complete search history.

(56) References Cited

U.S. PATENT DOCUMENTS

| | | |
|---|---|---|
| 3,952,032 A | 4/1976 | Vrancken et al. |
| 5,405,728 A | 4/1995 | Hopper et al. |
| 6,251,556 B1 | 6/2001 | Yoshida et al. |
| 6,942,954 B2 | 9/2005 | Patel et al. |
| 7,344,819 B2 | 3/2008 | Ikami et al. |
| 7,968,647 B2 * | 6/2011 | Gan ........................ 525/168 |
| 2008/0014526 A1 | 1/2008 | Miura et al. |
| 2008/0220362 A1 | 9/2008 | Moore et al. |

FOREIGN PATENT DOCUMENTS

| | | |
|---|---|---|
| EP | 1011031 | 6/2000 |
| JP | 2005213401 | 8/2005 |
| WO | 2009005335 | 1/2009 |

OTHER PUBLICATIONS

English Abstract of JP2005213401.

* cited by examiner

*Primary Examiner* — Mark A Chapman
(74) *Attorney, Agent, or Firm* — Preston Smirman; Smirman IP Law, PLLC

(57) ABSTRACT

A natural oil-based toner resin for producing toner in developing electrophotographic image comprising a copolymer of unsaturated polyester resins and vinyl monomers, wherein the polyester resins have a molecular weight of 500 to 30000 and obtained from polycondensation between a polycarboxylic acid, a natural oil or derivative thereof and a polyol. The toner resin in emulsion form is mixed with fine suspensions or emulsions of a colorant and a charge control agent; and a flocculating agent is incorporated therein to induce aggregation for forming particles of desired sizes, and subsequently the temperature is suitably raised to cause coalescence to produce raw toner particles of regular shape and smooth surface. The raw toner particles are washed and dried, and treated with suitable additives to produce the finished product of chemically produced toner.

17 Claims, 2 Drawing Sheets

NATURAL OIL-BASED CHEMICALLY PRODUCED TONER

CROSS-REFERENCE TO RELATED APPLICATION

The instant application is a national phase of PCT/MY2010/000090, filed Jun. 1, 2010, pending, which claims priority to Malaysian Patent Application No. PI 20093973, filed Sep. 24, 2009, pending, the entire specifications of both of which are expressly incorporated herein by reference.

FIELD OF INVENTION

The present invention relates to chemically produced toner (CPT) and a method for synthesizing thereof. More particularly, the present invention discloses a natural oil-based CPT for use in laser printers, photocopy machines and other similar applications, as well as a method for synthesizing the environmentally friendly natural oil-based unsaturated polyester resins.

BACKGROUND OF THE INVENTION

Toner is a fine, polymer-based powder which has electrical charge or possessing magnetic properties. It is widely used in laser printers, photocopiers and fax devices, which are based on electrophotographic technology invented more than 35 years ago. Toner starts off as a powder, and passes through these electrophotographic machines being heated to melt and ends up as a solid bonded to the printed paper as it is cooled down.

The conventional toner is made by compounding the ingredients, such as resins, pigments, magnetic iron oxides, waxes and charge control agents (CCA) by melting and blending the ingredients to form a paste. This mixture is then cooled by extruding onto a cooling belt into thin sheet or plate. The raw toner is then pelletized and ground into a fine powder within a controlled particle size range by jet mills or air-swept hammer mills. This process resulted in toner granules of various sizes and jagged shapes when viewed under a microscope. The over-size and under-size toner particles are sieved out. The pulverized powder is then blended with additives to adjust flow and electrostatic properties.

Particle size has significant effect on the toner performance. Finer size and more uniform shapes enable more accurate colour reproduction and more efficient toner use. Smaller laser beam dots and smaller toner particles could give better print quality. With the conventional process, the energy costs for production of smaller particles increase exponentially with smaller particle size.

CPT, the chemically produced toner, is also known as polymerization toner. Compared to conventional toners, it provides advantages such as developed by a simpler manufacturing process with the potential for a lower unit manufacturing cost and potential for lower capital investment in manufacturing plant. Besides, it provides improved print performance as it is capable of producing smaller and more uniform toner particles with better fixing and color performance. In particular, the CPT can be conveniently made from an emulsion polymer through emulsion polymerization process.

The particle size of CPT can be controlled by the reaction conditions such as stirring rate, surfactant concentration, temperature, mode and order of addition, core-shell formation and others. Additionally, CPT toners have a more uniform shape and can provide sharper imaging. They can be used in both monochrome and color applications.

Owing to the advantages provided by the CPT, researches into the creation of CPT have begun more than 30 years ago. The chemical processes involved have been directed towards the synthesis of the major component of the toner, which is the polymer binder or more specifically the toner resin. Polymerization methods for creating the toner resin can include suspension, dispersion, emulsion and core-shell or microencapsulation.

The most popular process for synthesizing CPT is the EA process, in which a polymer is first prepared by emulsion polymerization. The emulsion produced is further added with other required components such as CCA, wax and pigment, in very fine suspensions, followed by a water soluble coagulant or flocculating agent, and the temperature is adjusted close to the class transition temperature ($T_g$) of the polymer to cause aggregation of the polymer particles and the other components to form particles of desirable sizes. While maintaining the stirring at certain speed, the temperature is raised higher, usually above the $T_g$, to cause the aggregated particle to coalesce into smooth particle of regular shape. Subsequently, the temperature is reduced to allow solidification of the particles. They are then washed and dried to become the raw toner before being made into the final toner particles through the final additives blending step.

Many manufacturing processes of CPT have been based on the concept of EA and the products thereof have been patented in the prior arts, each with a different improvising approach and characteristic. For example, the U.S. Pat. No. 5,405,728 of Xerox Corporation discloses a toner manufactured by the EA technique whereby a counterionic surfactant is used to facilitate the aggregation to form the toner particles.

Disclosed in U.S. Pat. No. 6,251,556 is an invention of Fuji Xerox describing a toner made from a binder resin having a low molecular weight polymer obtained by emulsion polymerization of an unsaturated monomer or mixture of monomers at a temperature of 115° C. or higher in the presence or absence of a chain transfer agent.

U.S. Pat. No. 6,942,954 also describes an EA process involving heating a mixture of a magnetite dispersion, a colorant dispersion, a wax dispersion, a first latex containing a crosslinked resin, and a second latex containing a resin free of crosslinking in the presence of a coagulant to provide aggregates, stabilizing the aggregates with a silicate salt dissolved in a base, and further heating the aggregates to provide coalesced toner particles.

In the U.S. Pat. No. 7,344,819 filed on 24 Nov. 2004, belonging to Brother Kogyo Kabushiki Kaisha, a method for manufacturing toner includes the steps of combining a polymer resin and an organic solvent to obtain an oil-based solution; combining a dispersion stabilizer with water to obtain a water-based solution; adding an amphiphilic surfactant solvent to the water-based solution; emulsifying the oil-based solution in the water-based solution to form emulsion; and removing the organic solvent from the emulsion particles, which can then be used for manufacture of toner by the EA process.

Seeing the existing CPT disclosed by the prior arts are made from entirely petrochemicals which are derived from the non-renewable resources, and are non-sustainable, it is desirable for the present invention to provide a toner based on naturally derived materials, such as natural oils, particularly palm oils. More specifically, the use of palm oil-based unsaturated polyester resins, which could be easily copolymerized with other monomers to produce CPT, shall be a more environmental friendly approach as compared to the manufacture of CPT from 100% petrochemicals. There is also a need to provide a naturally derived product which is lower in cost yet comparable in quality to reduce the use of additives which are petrochemicals or toxic compounds, such as wax and CCA in the toner synthesis.

SUMMARY OF INVENTION

The primary object of the invention is to provide a toner resin based on unsaturated polyesters derived from natural oils such as vegetable oils or animal fats, preferably palm oil, which is environmentally friendly.

Another object of the invention is to provide a natural oil-based low molecular weight unsaturated polyester with double bond —C=C— which allows copolymerization with specific monomers for the chemical modification to achieve a final product that can attain the required performance of a CPT resin, with respect to the good fixing and offset properties.

Still another object of the present invention is to develop a method for synthesizing CPT using natural oil-derived polyesters which can reduce or eliminate the need of using wax as additive in the toner composition yet capable of providing high glossiness of the toner particles.

Yet another object of the present invention is to provide a method for synthesizing CPT which is simple and low in manufacturing cost as well as low capital investment in manufacturing plant.

Further object of the present invention is to optimize the use of natural oils such as palm oil as a raw material for the manufacture of a useful product which creates another avenue for commercialization of this natural product.

At least one of the preceding objects is met, in whole or in part, by the present invention, in which one of the embodiments of the present invention describes a natural oil-based chemically produced particulate toner for developing electrophotographic image comprising: an emulsion copolymer produced from emulsion polymerization of unsaturated polyester resins and vinyl monomers, wherein the polyester resins have a molecular weight of 500 to 30000 and are obtained from polycondensation between a polycarboxylic acid, a natural oil or derivative thereof and a polyol; a colourant and a charge control agent which are mixed with the emulsion; wherein the mixture has been treated with a flocculating agent to induce aggregation and form particles of desired sizes which are coalesced by heat treatment above the glass transition temperature, $T_g$, of the copolymer.

In one of the preferred embodiments of the present invention, the polycarboxylic acid is phthalic anhydride, adipic acid, fumaric acid, malic acid, malic anhydride or a combination of any two or more thereof. Preferably, the natural oil is palm oil or derivative thereof is derived from palm olein, palm stearin, palm kernel oil, capric acid, lauric acid, myristic acid, oleic acid, palmitic acid, palmitoleic, stearic acid, linoleic acid, linolenic acid or a combination of any two or more thereof. And the polyol is any compound having two or more hydroxyl groups, such as glycerol.

According to another preferred embodiment, the charge control agent (CCA) is a metal complex of chromium, zinc, or aluminium or a phenolic resin.

Yet another preferred embodiment of the present invention discloses that the flocculating agent is polyaluminum chloride (PAC).

Preferably, the toner can have a desired size of 4 to 12 microns, more preferably 5 to 8 microns.

Still another embodiment of the present invention is a toner resin which further comprises an additive. Preferably, the additive is silica, a metal oxide, a metal stearate or a combination of any two or more thereof.

Further embodiment of the present invention is a method for chemically producing a natural oil-based particulate toner comprising: polycondensing a polycarboxylic acid, a natural oil or derivative thereof and a polyol to form unsaturated polyester resins having molecular weight of 500 to 30000; copolymerizing the polyester with one or more vinyl monomers by emulsion polymerization to form a copolymer emulsion; mixing the emulsion with a colourant and a charge control agent; treating the mixture with a flocculating agent to induce aggregation to form particles of desired sizes; heating the mixture above the $T_g$ of the copolymer to coalesce the particles; and reducing the temperature to solidify the particles.

Preferably, the method further comprises a step of purifying the raw toner particles through washing and drying. Further, it can also comprise a step of blending the purified raw toner with additives, such as silica, a metal oxide, a metal stearate or a combination of any two or more thereof.

The copolymerization of natural oil-based unsaturated polyester enable the use of higher proportion of styrene monomer over acrylic monomers, and this has the effect of bringing down the cost of the final product as both the palm oil-based unsaturated polyesters and styrene monomer are cheaper than acrylic monomers. The copolymerization of the palm oil-based unsaturated polyester with styrene and acrylic monomers can lead to a molecular weight distribution having multiple peaks, meaning that the copolymer consists of a mixture of broad range of molecular weights, where there is fraction of lower molecular weight to provide good fixing properties and fraction of higher molecular weights to provide good offset properties. There are also fractions with molecular weight in between these two extremes, to balance the properties of fixing and offsetting, resulting in a CPT resin with easy processing properties and good printing performances.

The incorporation of the palm oil-based unsaturated polyester has another advantage. The polyester itself possesses certain desirable wax-like properties. Consequently, it eliminates the need to use other wax in the final formulation of the toner. The natural oil-based polyester also imparts a higher glossiness to the toner, resulting in better print quality. Yet another advantage of the incorporation of the palm oil based polyester is that the structure can be pre-designed to carry certain polar groups such as hydroxyl —OH, carboxylic —COOH and sulphonic —SO$_3$H groups which can enhance the charging properties of the toner, and thus reduce the use of CCA in the formulation of the final toner.

One skilled in the art will readily appreciate that the present invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

Figure 1:
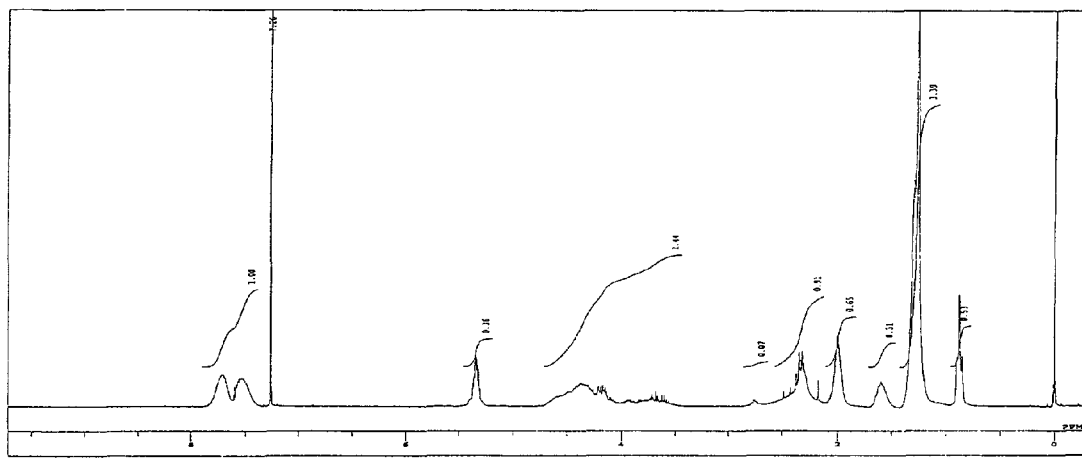
FIG. 1 is the $^1$H NMR spectrum of one of the polyesters (macromer M4) as described in one of the preferred embodiments of the present invention, in which the k, d, c, f, g and s indicate the various protons of different chemical environments in the structure of copolymer.

The present invention relates to chemically produced toner (CPT) and a method for synthesizing thereof. More particularly, the present invention discloses a natural oil-based CPT for use in laser printers, photocopy machines and other similar applications, as well as a method for synthesizing the environmentally friendly natural oil-based unsaturated polyester resins.

Hereinafter, the invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

The present invention discloses a natural oil-based chemically produced particulate toner for developing electrophotographic image comprising: a copolymer emulsion of unsaturated polyester resins and vinyl monomers produced by emulsion polymerization, wherein the polyester resins have a molecular weight of 500 to 30000 and are obtained from polycondensation between a polycarboxylic acid, a natural oil or derivative thereof and a polyol; a colourant and a charge control agent which are mixed with the emulsion; wherein the mixture has been treated with a flocculating agent to induce aggregation and form particles of desired sizes which are coalesced by heat treatment above the $T_g$ of the copolymer.

This invention is characterized by the use of natural oils for the synthesis of a polyester to be incorporated into the synthesis of the toner particles. The polyol used for the polycondensation of the present invention is a compound having two or more hydroxyl groups, preferably glycerol derived from vegetable oils or animal fats.

In accordance with the preferred embodiment, the polycarboxylic acid is phthalic anhydride, adipic acid, fumaric acid, malic acid, malic anhydride or a combination of any two or more thereof. Preferably, the natural oil or derivative thereof is derived from palm olein, palm stearin, palm kernel oil, capric acid, lauric acid, myristic acid, oleic acid, palmitic acid, palmitoleic, stearic acid, linoleic acid, linolenic acid or a combination of any two or more thereof.

In the most preferred embodiment of the present invention, the natural oils used as the main raw materials are preferably to be palm oil and its derivatives. The preferable palm oil derivatives include palm olein, palm stearin, palm kernel oil, capric acid, lauric acid, myristic acid, oleic acid, palmitic acid, palmitoleic, stearic acid, linoleic acid and linolenic acid. Likewise, other natural oils can include the oils and all free fatty acids derived thereof.

In the present invention, high content of natural materials is employed for the synthesis of the environmentally friendly natural oil-based unsaturated polyester resins, whereby the amount of natural materials used is in a range of 40% to 100% by mass of the end products. While illustrated by using palm oil and its derivatives as raw materials, the palm oil-based polyester resins may contain between 20% to more than 80% by mass of palm oil and its derivatives in the overall formulation. The polyester is made by condensation polymerization in a fusion cook, so that the product is solvent-free and yet is in the form of a liquid.

An example of the plausible structure of the palm oil-based polyester can be represented by the following reaction scheme, in which the polyester resin can be made of phthalic anhydride, glycerol, palm oil and fumaric acid.

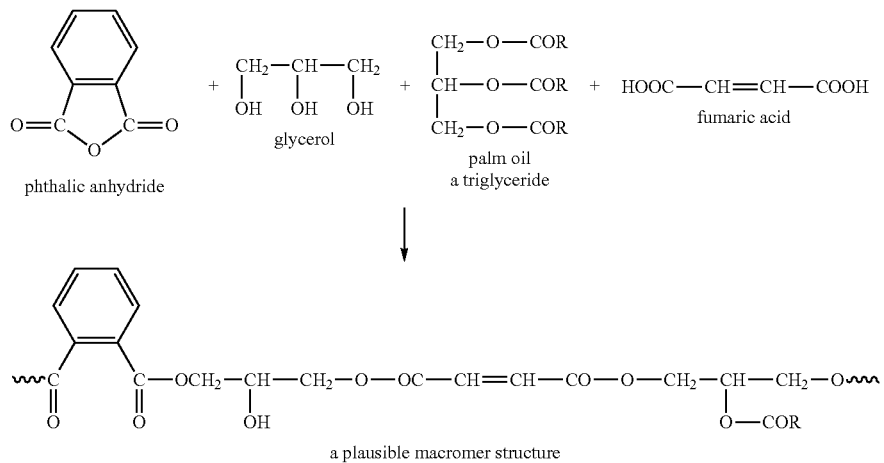

a plausible macromer structure

Another example of example of the plausible structure of the palm oil-based polyester made from phthalic anhydride, glycerol, oleic acid and fumaric acid is shown below. The formulations of the palm oil-based polyester resins are further disclosed in Example 1.

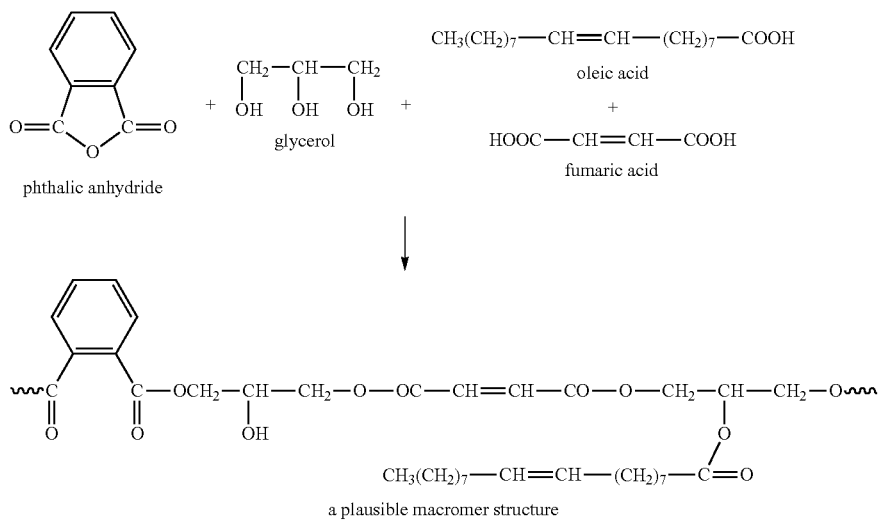

a plausible macromer structure

In accordance with the preferred embodiment of the present invention, the alkenyl (C=C) group of the unsaturated polyester resin can be further polymerized by free radical which enables the polyester molecule to behave as a macromer (or a macromonomer) in order to copolymerize with the vinyl monomers. Preferably, the vinyl monomer is styrene, methyl methacrylate, BA, acrylic acid, methacrylic acid or a combination of any two or more thereof.

An effective way to regulate the ability of the polyester to copolymerize with vinyl monomers is through the control of the amount of alkenyl (C=C) groups, which is introduced through the unsaturated dicarboxylic acids such as formic acid, maleic acid and maleic anhydride. Some free fatty acid components of the oil molecule may also contain alkenyl group, for example the oleic acid has one alkenyl group per molecule.

As embodied in the present invention, the toner contains a copolymer resin, colourant, CCA and flocculating agent. The use of pigment defines the monochrome or colour of the toner. Suitable colorants for use in the toner of the present invention include known dyes and pigments. Pigments which can be used in the present invention are also well known in the art and are commercially available from suppliers such as BASF, Cabot Corp., CIBA, Clariant, Degussa, DuPont, Heubach, and Mobay Chemical Corp. Specific examples of the colorants include carbon black, Nigrosine dyes, black iron oxide, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS AND BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and the like, naphthol yellow S, Hansa Yellow (10G, 5G and G), Cadmium Yellow, yellow iron oxide, chrome yellow, Titan Yellow, polyazo yellow, Benzidine Yellow (G and GR), Vulcan Fast Yellow (5G and R), Tartrazine Lake, Quinoline Yellow lake, AnthrazaneYellow BGL, isoindolinone yellow, red iron oxide, red lead, orange lead, cadmiumred, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, permenant red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, Bon Maroon, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, These materials are used alone or in combination.

According to another preferred embodiment, the CCA is preferably colourless, however coloured CCA may also be used. Suitable CCA includes metal complexes of chromium, zinc, aluminium or the likes, more preferably aluminum or zinc complexes and phenolic resins.

Together added into the emulsion of copolymer with the colourant and CCA is the flocculating agent. The flocculating agent is capable of inducing the aggregation of the polymer and the other components to form aggregated particles of desirable sizes, when the temperature of the reaction is adjusted close to the glass transition temperature ($T_g$) of the polymer or slightly higher than $T_g$. Preferably, the aggregated particles can have desired sizes of 4 to 12 microns, more preferably 5 to 8 microns. While maintaining the stirring of the emulsion at certain speed, the temperature is raised higher, usually more than 10° C. above the $T_g$, to cause the aggregated particle to coalesce into smooth particle of regular shape.

According to the preferred embodiment of the present invention, the flocculating agent is a compound containing multivalent cations of metallic element such as aluminium, iron, calcium or magnesium. The flocculating agents or coagulants are chemicals that cause colloids and other small particles in liquids to aggregate. These compounds can ionize in aqueous phase to produce positively charged ions that interact with negatively charged particles and molecules to reduce the barriers to aggregation. According to the most preferred embodiment of the present invention, the flocculating agent is poly(aluminum chloride) (PAC).

Still another embodiment of the present invention discloses that the raw toner particles, which were obtained from the coalesced particles after washing and drying, may then be blended with one or more surface additives to improve the powder flow properties of the toner, or to adjust the tribocharge properties for optimum performance to suit specific printer or photocopier. Typical surface additives include, but are not limited to, silica, metal oxides (such as titania and alumina) and metal stearates (such as zinc stearate).

In a further embodiment, the present invention discloses a method for chemically producing a natural oil-based particulate toner comprising: polycondensing a polycarboxylic acid, a natural oil or derivative thereof and a polyol to form unsaturated polyester resins having molecular weight of 500 to 30000; copolymerizing the polyester with one or more vinyl monomers to form a copolymer emulsion; mixing the emulsion with a colourant and a charge control agent; treating the mixture with a flocculating agent to induce aggregation to form particles of desired sizes; heating the mixture above the $T_g$ of the copolymer to coalesce the particles; and reducing the temperature to solidify the particles.

One skilled in the art can appreciate the fact that some petrochemicals can also be used in the present invention, such as ethylene glycol and 1,4-butandiol (to replace glycerol), terephthalic acid, adipic acid, isophthalic acid and sebacic acid (to replace phthalic anhydride). However, the use of petrochemicals in the toner resins formulation will not provide as much as the advantages provided by the natural oil-derived raw materials.

On the other hand, azelaic acid, which is a saturated dicarboxylic acid found naturally in wheat, rye, and barley, could also be used to replace phthalic anhydride to increase the content of natural materials in the polyester.

In the present invention, the polyester is copolymerized with one or more vinyl monomer in emulsion polymerization using free radical initiator to form a copolymer or latex. As described in the foregoing embodiment, the vinyl monomers are selected from the group consisting of styrene, methyl methacrylate, acrylic acid and butyl acrylate. In transforming the initial liquid macromer to a solid with desired properties of toner resin, the required amount of vinyl monomers is dependent on the choice of vinyl monomer. According to the most preferred embodiment, it is preferable to use styrene owing to its lower cost. Small amount of acrylic monomer may be necessary to achieve the required $T_g$ of the final copolymers.

The copolymerization of the palm oil-based polyester and vinyl monomers in emulsion polymerization can be carried out in more than one ways. The procedures of emulsion polymerization are described in Example 2 to 4. The incorporation of the macromer into the final emulsion copolymer can be proven by FTIR spectroscopy. The characteristic peaks of the FTIR spectra of different copolymers are further discussed in Example 5 and 6.

The copolymer latex produced from anyone of the processes described in the examples can be used in the EA process. The latex particles produced by emulsion polymerization could be smaller than 0.1 μm (micron) and remain continuously in motion due to electrostatic charge which causes them to repel each other. Once their electrostatic charge is disturbed or neutralized by the use of a coagulant chemical, the finer particles start to collide and agglomerate under the influence of Van der Waals's forces to form larger particles in the EA process.

The latex is mixed with pigment emulsion, CCA and flocculating agent, at a temperature around the $T_g$ of the copolymer, to form aggregated particles of the desired sizes. While maintaining the stirring at certain speed, the temperature is raised above the $T_g$ of the copolymer, to cause the aggregated particle to coalesce into smooth particle of regular shape. Subsequently, the temperature is reduced to allow solidification of the raw toner particles.

Preferably, the method further comprises a step of purifying raw toner particles, in which the raw toner particles can be washed and dried before being processed into finished toner through the final additives blending step. As set forth in the preceding description, the additives can be silica, metal oxides (such as titania and alumina) or metal stearates (such as zinc stearate). Since the polyester can impart the properties of a wax, the formulation for the EA process does not require the addition of wax as claimed by many other patents.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

EXAMPLE

Examples are provided below to illustrate different aspects and embodiments of the present invention. These examples are not intended in any way to limit the disclosed invention, which is limited only by the claims.

Example 1

Table 1 shows four examples of formulations of palm oil-based macromers or polyester resins. The alkenyl (—C=C—) groups were incorporated into the macromer molecule from either the unsaturated dicarboxylic acid such as fumaric acid or maleic acid, or the unsaturated free fatty acid such as oleic acid, or contribution from both sources.

TABLE 1

| Macromer | M1 | M2 | M3 | M4 |
|---|---|---|---|---|
| Composition/ weight in g | | | | |
| Palm olein | 460 | 0.0 | 204 | 0 |
| Palm kernel oil | 0 | 587 | 0 | 0.0 |
| Oleic acid | 0.0 | 0 | 0.0 | 210 |
| Phthalic anhydride | 135 | 194 | 250 | 100 |
| Fumaric acid | 70 | 51 | 0 | 40 |
| Maleic anhydride | 0.0 | 0.0 | 97 | 0 |
| Glycerol | 110 | 140 | 185 | 126 |
| Properties | | | | |
| Apperance | liquid | liquid | liquid | liquid |

Figure 2:
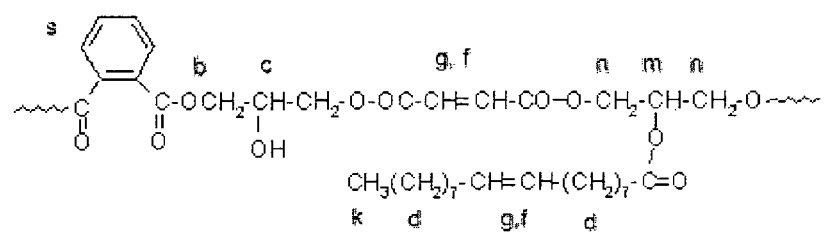
FIG. 2 shows a plausible structure of one of the polyesters (macromer M4) as described in one of the preferred embodiments of the present invention, where k, d, c, f, g and s indicate the various protons of different chemical environments in the NMR spectrum as in FIG. 1.

The formation of the macromer can be monitored by nuclear magnetic resonance, $^1$H-NMR spectroscopy, in which the —CH=CH— moiety of the polyester can be seen at a chemical shift of 5.0-5.5 ppm in the spectrum. For example, the NMR spectrum recorded by the unsaturated polyester macromer M4 is illustrated in FIG. 1. FIG. 2 shows a plausible structure of M4, where k, d, c, f, g and s indicates the various protons of different chemical environments in the NMR spectrum. The presence of unsaturation —CH=CH— is confirmed by protons g and f at around 5.2-5.4 ppm of the $^1$H-NMR spectrum. This was also observed for the other macromers M1, M2 and M3.

Example 2

The palm oil-based macromer is mixed with the vinyl monomers to form a solution of the polyester in the vinyl monomers. It is then mixed with the required amount of water containing surfactants and agitated with stirrer to form emulsion and heated to the required temperature. Aqueous solution of a free radical initiator, such as potassium persulphate, is then added to start the emulsion polymerization. In this way, 0-40% macromer can be used, preferably 5-25% macromer to be used. Excessive macromer led to excessive crosslinking reactions, causing the formation of gel or shifting the $T_g$ of the final product out of the range required for good toner performance.

Example 3

The macromer was first added to an aqueous surfactant solution and agitated at high speed to form an emulsion. The required amount is then added into the emulsion of vinyl monomers mixture in similar surfactant system. The mixture was stirred for a few hours and heated to the required temperature before the aqueous solution of a free radical initiator, such as potassium persulphate, is added to start the emulsion polymerization.

Example 4

The macromer was first added to an aqueous surfactant solution and agitated at high speed to form an emulsion. After raising to the desired temperature, 10-20% of the free radical initiator solution is added to allow the macromer to partially polymerize to form the "seed" particles. The emulsion of the vinyl monomers mixture in similar surfactant system and the balance of the initiator are then added in slowly.

Example 5

Figure 3:
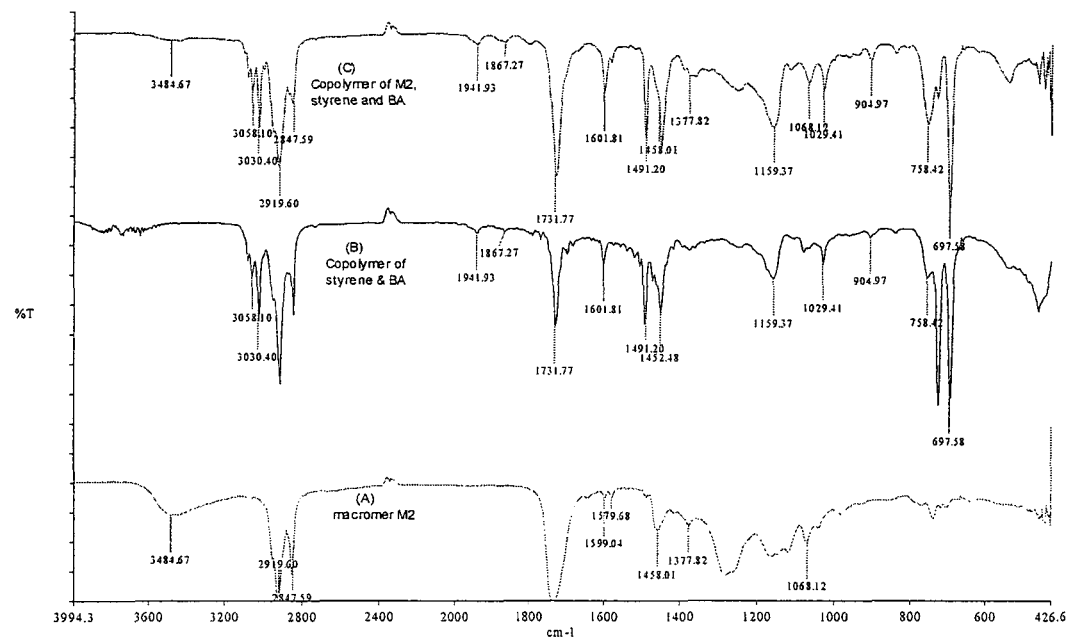
FIG. 3 is the fourier transform infrared (FTIR) spectra of one of the polyesters (macromer M2) (A), copolymer of styrene and BA (B), as well as copolymer of M2, styrene and BA (C), as described in one of the preferred embodiments of the present invention.

The incorporation of the macromer into the final emulsion copolymer was proven by FTIR spectroscopy. Illustrated in FIG. 3 is the copolymer of M2, styrene and BA (spectrum C). The spectrum contained various characteristic peaks which were found exclusively in spectrum (A) of macromer M2, and those exclusively in spectrum (B) of copolymer of styrene and BA. There are certain peaks, which were found in all the three spectra due to similar groups. These include the peaks at 2919 and 2759 cm$^{-1}$ due to C—H stretching, 1732 cm$^{-1}$ due to C$\alpha$O, 1599 to 1601 cm$^{-1}$ due to the "breathing mode" of the aromatic rings found in all the three.

Example 6

Figure 4:
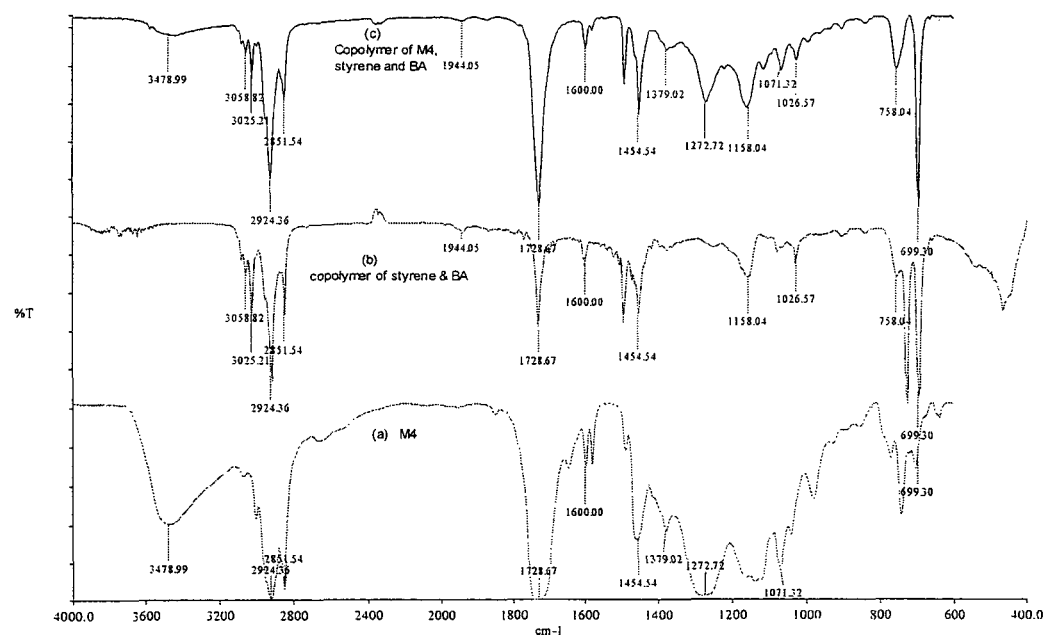
FIG. 4 is the FTIR spectra of one of the polyesters (macromer M4) (A), copolymer of styrene and BA (B), as well as copolymer of M4, styrene and BA (C), as described in one of the preferred embodiments of the present invention.

Another example of the FTIR evidence is shown by FIG. 4 for the incorporation of macromer M4 into the emulsion copolymer. The copolymer was produced by emulsion polymerization of 297.3 g of styrene, 99.6 g of butyl acrylate and 145 g of macromer M4. Spectrum (C) is from the copolymer containing macromer M4. The spectrum contained various characteristic peaks which were found exclusively in spectrum (A) of macromer M4, and those exclusively in spectrum (B) of copolymer of styrene and BA.

The invention claimed is:
1. A natural oil-based chemically produced toner for developing electrophotographic images, comprising:
    a latex or an emulsion of free radical-initiated copolymer made of 0.1% to 40% unsaturated macromers and vinyl monomers;
    wherein the macromers have a molecular weight of 500 to 30000 and are obtained from a polycondensation reaction between a polycarboxylic acid, a natural oil or derivative thereof and a polyol, via a solvent-free fusion cook process, in which an unsaturated dicarboxylic acid, an unsaturated free fatty acid or the combination thereof is incorporated therein to regulate the amount of alkenyl groups of the macromers;
    a colourant;
    a charge control agent;
    wherein the colourant and the charge control agent are mixed into the copolymer emulsion;
    a flocculating agent added into the mixture to form aggregated particles of predetermined sizes;
    wherein the aggregated particles are then coalesced into uniform and regular shapes by the raising of the temperature of the mixture above the glass transition temperature of the copolymer, and then solidified by the lowering of the temperature of the mixture;
    wherein the solidified coalesced particles are separated, washed and dried to form raw toner particles; and
    a surface additive added into the raw toner particles to form the toner.

2. The toner according to claim 1, wherein the polycarboxylic acid is selected from the group consisting of phthalic anhydride, adipic acid, fumaric acid, malic acid, malic anhydride, and combinations thereof.

3. The toner according to claim 1, wherein the natural oil or derivative thereof is derived from a material selected from the group consisting of palm olein, palm stearin, palm kernel oil, capric acid, lauric acid, myristic acid, oleic acid, palmitic acid, palmitoleic, stearic acid, linoleic acid, linolenic acid, and combinations thereof.

4. The toner according to claim 1, wherein the polyol is glycerol derived from a material selected from the group consisting of palm oil, coconut oil, soy oil, jatropa oil, linseed oil, castor oil, rapeseed oil, tallow oil, fish oil, and combinations thereof.

5. The toner according to claim 1, wherein the vinyl monomer is selected from the group consisting of styrene, methyl methacrylate, butyl acrylate, acrylic acid, methacrylic acid, and combinations thereof.

6. The toner according to claim 1, wherein the charge control agent is selected from the group consisting of a metal complex of chromium, zinc, or aluminum, a phenolic resin, and combinations thereof.

7. The toner according to claim 1, wherein the flocculating agent is polyaluminum chloride.

8. The toner according to claim 1, wherein the predetermined sizes are in a range of 4 to 12 microns.

9. The toner according to claim 1, wherein the surface additive is selected from the group consisting of silica, a metal oxide, a metal stearate, and combinations thereof.

10. A method for chemically producing a natural oil-based toner, comprising:
    synthesizing unsaturated macromers having a molecular weight of 500 to 30000 by a polycondensation reaction of a polycarboxylic acid, a natural oil or derivative thereof and a polyol, via a solvent-free fusion cook process, in which an unsaturated dicarboxylic acid, an unsaturated free fatty acid or the combination thereof is incorporated therein to regulate the amount of alkenyl groups of the macromers;
    copolymerizing 0.1% to 40% macromers with vinyl monomers to form a latex or an emulsion of copolymer in the presence of a free radical initiator;
    providing a colourant;
    providing a charge control agent;
    mixing the copolymer emulsion with the colourant and the charge control agent;
    providing a flocculating agent;

adding the flocculating agent into the mixture to obtain aggregated particles of predetermined sizes;

raising the temperature of the mixture above the glass transition temperature of the copolymer to coalesce the particles into uniform and regular shapes;

lowering the temperature of the mixture to solidify the coalesced particles;

separating, washing and drying the solidified coalesced particles to form raw toner particles;

providing a surface additive; and adding the surface additive into the raw toner particles to form the toner.

11. The method according to claim 10, wherein the polycarboxylic acid is selected from the group consisting of phthalic anhydride, adipic acid, fumaric acid, malic acid, malic anhydride, and combinations thereof.

12. The method according to claim 10, wherein the natural oil or derivative thereof is derived from a material selected from the group consisting of palm olein, palm stearin, palm kernel oil, capric acid, lauric acid, myristic acid, oleic acid, palmitic acid, palmitoleic, stearic acid, linoleic acid, linolenic acid, and combinations thereof.

13. The method according to claim 10, wherein the polyol is glycerol derived from a material selected from the group consisting of palm oil, coconut oil, soy oil, jatropa oil, linseed oil, castor oil, rapeseed oil, tallow oil, fish oil, and combinations thereof.

14. The method according to claim 10, wherein the vinyl monomer is selected from the group consisting of styrene, methyl methacrylate, butyl acrylate, acrylic acid, methacrylic acid, and combinations thereof.

15. The method according to claim 10, wherein the charge control agent is selected from the group consisting of a metal complex of chromium, zinc, or aluminum, a phenolic resin, and combinations thereof.

16. The method according to claim 10, wherein the flocculating agent is polyaluminum chloride.

17. The method according to claim 10, wherein the surface additive is selected from the group consisting of silica, a metal oxide, a metal stearate, and combinations thereof.

* * * * *